(12) United States Patent
Yoneyama et al.

(10) Patent No.: US 8,247,468 B2
(45) Date of Patent: Aug. 21, 2012

(54) COMPOSITION FOR HARD COAT, ARTICLE HAVING HARD COAT LAYER AND METHOD FOR PRODUCING THE ARTICLE

(75) Inventors: Kenji Yoneyama, Sagamihara (JP); Kazushi Tanaka, Tokyo (JP); Hiroyuki Hashiguchi, Neyagawa (JP); Koichi Ueda, Neyagawa (JP)

(73) Assignee: TDK Corporation, Tokyo (JP)

( * ) Notice: Subject to any disclaimer, the term of this patent is extended or adjusted under 35 U.S.C. 154(b) by 819 days.

(21) Appl. No.: 12/314,485

(22) Filed: Dec. 11, 2008

(65) Prior Publication Data

US 2009/0155513 A1   Jun. 18, 2009

(30) Foreign Application Priority Data

Dec. 12, 2007 (JP) ................................ 2007-320764

(51) Int. Cl.
 *B29C 71/04* (2006.01)
 *C08F 283/12* (2006.01)

(52) U.S. Cl. ............... 522/71; 522/81; 522/83; 522/99; 522/114; 522/120; 522/135; 522/144; 522/148; 522/149; 522/172; 428/65.1

(58) Field of Classification Search ............... 428/64.4, 428/65.1; 522/99, 114, 122, 71, 81, 83, 120, 522/135, 144, 148, 149, 172
See application file for complete search history.

(56) References Cited

U.S. PATENT DOCUMENTS

| | | | | |
|---|---|---|---|---|
| 5,976,684 | A | * | 11/1999 | Oyama et al. ................. 428/216 |
| 6,297,908 | B1 | * | 10/2001 | Suga ............................. 359/599 |
| 6,706,359 | B2 | | 3/2004 | Mino et al. |
| 6,992,117 | B2 | | 1/2006 | Shimomura et al. |
| 8,071,195 | B2 | * | 12/2011 | Yoneyama et al. .......... 428/64.4 |
| 2007/0086091 | A1 | * | 4/2007 | Sawanobori et al. ......... 359/582 |

FOREIGN PATENT DOCUMENTS

| | | |
|---|---|---|
| JP | 11-43648 | 2/1999 |
| JP | 2002-363495 | 12/2002 |
| JP | 2002-367229 | 12/2002 |
| JP | 2003-277478 | 10/2003 |
| JP | 2004-47040 | 2/2004 |
| JP | 2005-206829 | 8/2005 |
| JP | 2006-107572 | 4/2006 |
| JP | 2008056789 A * | 3/2008 |

OTHER PUBLICATIONS

Machine translation of JP 2008-056789 prepared on Oct. 19, 2011.*
English translation of JP 2004-47040 (Feb. 2004).
English translation of JP 2006-107572 (Apr. 2006).
English translation of JP 2005-206829 (Aug. 2005).
English translation of JP 11-43648 (Feb. 1999).
English translation of JP 2002-363495 (Dec. 2002).

* cited by examiner

*Primary Examiner* — Gerard Higgins
(74) *Attorney, Agent, or Firm* — Wenderoth, Lind & Ponack, L.L.P.

(57) ABSTRACT

The present invention provides a composition for hard coat capable of forming a hard coat layer having the improved anti-staining property, anti-staining durability, scratch resistance, abrasion resistance, antistatic property and the like. A composition for hard coat comprising: an active energy ray-curable silicone-acrylic copolymer (A); an active energy ray-curable polyfunctional compound (B); and an electrically conductive material (C), wherein the active energy ray-curable silicone-acrylic copolymer (A) contains: a polysiloxane block (a-1), an acrylic block (a-2) containing an active energy ray-curable double bond group, and a fluoroalkyl group-containing acrylic block (a-3).

4 Claims, 3 Drawing Sheets

Laser beam

Laser beam

COMPOSITION FOR HARD COAT, ARTICLE HAVING HARD COAT LAYER AND METHOD FOR PRODUCING THE ARTICLE

BACKGROUND OF THE INVENTION

1. Field of the Invention

The present invention relates to a composition for hard coat, and an article having a hard coat layer and a method for producing the article. More specifically, the present invention relates to a composition for hard coat capable of forming a satisfactory hard coat layer in various articles required to have properties such as anti-staining property, anti-staining durability, scratch resistance, abrasion resistance and antistatic property, an article having, on the surface thereof, a hard coat layer having these various properties, and a method for producing the article.

In particular, the present invention relates to a composition for hard coat capable of forming a hard coat layer having anti-staining property, anti-staining durability, scratch resistance, abrasion resistance and antistatic property, on the surface of each of the following, without deteriorating the optical property and the recording properties: information recording media; optical lenses; optical filters; anti-reflective films; various display elements such as liquid crystal displays, CRT displays, plasma displays and EL displays; and the like, and relates to a method for forming a hard coat layer and a product having a hard coat layer formed thereon.

2. Disclosure of the Related Art

In these years, there have been used as information recording media a various types of information recording media such as CD, MD, MO, DVD, BD (Blu-ray Disc), and HD-DVD. Among these information recording media, CD, DVD, BD and HD-DVD are so-called bare discs not inserted into cartridges. These bare discs tend to undergo stain or fingerprint adhesion on the signal recording/reading side surface, and there occurs a possibility that such stains cause troubles at the time of recording/reproducing. These bare discs have a problem that scratches and the like tend to be formed on the signal recording/reading side surface also at the time of insertion/removal of the disc. Accordingly, these bare discs are generally improved in properties such as anti-staining property, scratch resistance and abrasion resistance by providing a protective film and/or a hard coat layer on the signal recording/reading side surface.

In particular, information recording media such as BD and HD-DVD said to be next-generation DVD are undergoing promoted miniaturization of recording pits, and are characterized by undergoing high-density recording. For example, the laser spot size of BD is extremely as small as about ⅕ the spot size of conventional DVD. Accordingly, information recording media such as BD and HD-DVD may suffer from a crucial failure in recording and/or reproduction, caused by such minute scratches or stains on the recording side surface of the discs that cause no troubles in conventional CD, DVD and the like. Therefore, it is strongly demanded to provide, on the surface of the information recording media, a hard coat layer excellent in anti-staining property and abrasion resistance such that no fingerprint is adhered on the surface of an information recording medium, or even if fingerprint is adhered on the surface of an information recording medium the fingerprint can be readily wiped off without damaging the surface.

Among the above-described information recording media, the media used as bare discs have an additional problem that dust adhered to the disc surface also significantly affects the recording and/or reproduction. Therefore, such information recording media are strongly demanded to be excellent in antistatic property as well as the anti-staining property, scratch resistance and abrasion resistance.

Also, in articles other than the above-described information recording media, for example, optical lenses, optical filters, anti-reflective films and various display elements such as liquid crystal displays, plasma displays and EL displays, or the like, it is strongly demanded to provide, on the surface of these articles, a hard coat layer excellent in anti-staining property and abrasion resistance such that no fingerprint is adhered on the surface of such articles, or even if fingerprint is adhered on the surface of such articles the fingerprint can be readily wiped off without damaging the surface. These various display elements are further required to have antistatic property in order to prevent the adhesion of dust, oil mist (dust mixed with oil and fat) in the air or the like, and to prevent the generation of electric signal noises due to the static electrification of the display elements.

As a method of improving the anti-staining property of a hard coat layer, there has been proposed a method of improving the anti-staining property (water repellency and oil repellency) of the surface of an article by applying silicone oil or a fluoropolymer to the surface of the hard coat layer. However, in this method, the hard coat layer is formed by applying an anti-staining agent onto the surface of the article, and hence this method offers a drawback that the anti-staining agent is dissipated in the course of the use of the article by a user and consequently the effect of the anti-staining property is hardly maintained, that is, the hard coat layer is poor in anti-staining durability.

On the other hand, there is a method of improving the anti-staining property by incorporating an additive such as silicone oil or a fluoropolymer to the hard coat layer. However, these additives are the substances generally referred to as soft segment and have a property to impart flexibility to a resin, and hence the addition of these additives offers a drawback to degrade the mechanical strength of the hard coat layer such as the surface hardness as a function of the hard coat layer.

For example, Japanese Patent Laid-Open No. 2004-047040 (Patent Document 1) describes an optical recording medium characterized in that a coating layer made of an anti-staining agent is formed on the reading side surface on which incident is the laser light conducting at least recording or reproduction of the information signal (claim 1). However, the anti-staining agent described in Patent Document 1 includes an alkoxysilane compound having a perfluoro polyether group or a fluoroalkyl group, and is different from compositions for the hard coat layer according to the present invention.

Japanese Patent Laid-Open No. 2002-367229 (Patent Document 2) describes an optical information recording medium in which at least a reflective film, a recording film and a protective film are provided on one surface of the substrate of the optical information recording medium, and the protective film is formed as a surface layer on the one surface of the substrate, wherein a hard coat resin layer is formed as an outer layer of at least one selected from the substrate and the protective film, and a chemical adsorption film made of organic silane molecules is formed as an outer layer of the hard coat resin layer so as to be bonded to the hard coat layer through a covalent bond (claim 1). The hard coat layer of Patent Document 2 is, as described therein, a so-called double layered hard coat layer in which the chemical adsorption film formed by covalent bonds is further provided on the surface of the hard coat resin layer, and is significantly different in constitution from the hard coat layer of the present invention.

Japanese Patent Laid-Open No. 2006-107572 (Patent Document 3) describes a hard coat surface treatment method wherein a hard coat surface formed by curing an organic hard coat material containing an energy ray curable compound is subjected to a plasma treatment in an atmosphere into which introduced is a gas of a fluorinated hydrocarbon containing fluorine atoms in the molecule (claim 1). Patent Document 3 describes that according to this method, there is provided a hard coat surface treatment method in which the medium surface is imparted with water repellency and oil repellency by means of a low cost and simple process; however, this method requires a specific large scale apparatus in order to conduct the plasma treatment under a specific atmosphere, and hence is insufficient as a simple and low cost process.

Japanese Patent Laid-Open No. 2003-277478 (Patent Document 4) describes an epoxy resin composition that includes: an epoxy resin having in one molecule at least two cyclic aliphatic epoxy groups, at least one perfluoroalkyl group having 6 to 12 carbon atoms and at least one alkylsiloxane group; and a cationic polymerization catalyst, wherein the cyclic aliphatic epoxy group and the perfluoroalkyl group are present in the branched chains of the epoxy resin, and the alkylsiloxane group is present in the main chain of the epoxy resin (claim 1). Patent Document 4 is concerned with a composition that is applied to a liquid jet recording head, and the layer formed from the composition has anti-staining property, but is insufficient for a hard coat layer that also has the mechanical strength such as the surface hardness required in information recording media, various display elements or the like.

Japanese Patent Laid-Open No. 2005-206829 (Patent Document 5) describes a fluorine-containing curable coating liquid containing a fluorine-containing compound having a film formability and a polymerizable double bond, and a fluorine-containing (meth)acrylic acid ester having no film formability (claim 1). Similarly to Patent Document 4, the layer formed from the coating liquid of Patent Document 5 has anti-staining property, but is insufficient for a hard coat layer that also has the mechanical strength such as the surface hardness required in information recording media, various display elements or the like. As a technique to improve the surface hardness, it is possible to provide a hard coat layer and to form thereon a fluorine-containing curable coating film; however, this method suffers from a trouble that the fluorine-containing curable coating film is dissipated in the course of the use by a user to lead to poor anti-staining durability.

Japanese Patent Laid-Open No. 11-43648 (Patent Document 6) describes a curable resin composition for a coating material including: (a) a silicone-acrylic block copolymer obtained by polymerizing at least one kind of acrylic monomer having a cross-linkable functional group or a mixture composed of said acrylic monomer and another ethylenically unsaturated monomer in the presence of a silicone macro initiator that includes a plurality of polysiloxane chains having both terminals linked with a 2,2'-azobisnitrile group; (b) a film forming resin having a functional group capable of cross-linking with the same curing agent as for the cross-linkable functional group of the (a) component, or having a functional group that mutually reacts with the functional group of the (a) component; and (c) a curing agent that reacts at least with the (b) component (claim 1). However, the composition described in Patent Document 6 is different from the composition applied to the present invention, and is insufficient for the hard coat layer having anti-staining property, anti-staining durability, scratch resistance and abrasion resistance, without impairing the optical properties and the recording properties as required for articles and various display elements.

Japanese Patent Laid-Open No. 2002-363495 (Patent Document 7) describes a coating composition including: (a) a fluorine/silicone-acrylic block copolymer obtained by polymerizing a monomer mixture A including a fluorine-containing unsaturated monomer (a-1) and an acrylic monomer (a-2) having a reactive functional group, in the presence of a silicone macro initiator that includes a plurality of polysiloxane chains having both terminals linked with a 2,2'-azobisnitrile group; (b) a fluorine-containing copolymer obtained by polymerizing a monomer mixture B including a fluorine-containing unsaturated monomer (b-1) and an acrylic monomer (b-2) having a reactive functional group; and (c) a curing agent (claim 1). However, the composition described in Patent Document 7 is different from the composition applied to the present invention, and is insufficient for the hard coat layer having anti-staining property, anti-staining durability, scratch resistance and abrasion resistance, without impairing the optical properties and the recording properties as required for articles and various display elements.

SUMMARY OF THE INVENTION

An object of the present invention is to inexpensively provide an article having a hard coat layer formed thereon excellent in anti-staining property, anti-staining durability, scratch resistance, abrasion resistance and antistatic property, by solving the above-described conventional technical problems. Additionally, another object of the present invention is to provide a production method of inexpensively and easily forming a hard coat excellent in anti-staining property, anti-staining durability, scratch resistance, abrasion resistance and antistatic property.

The present invention provides a composition for hard coat to thereby achieve the above-described objects, comprising: an active energy ray-curable silicone-acrylic copolymer (A); an active energy ray-curable polyfunctional compound (B); and an electrically conductive material (C), wherein the active energy ray-curable silicone-acrylic copolymer (A) contains:

a polysiloxane block (a-1) represented by the following formula (I):

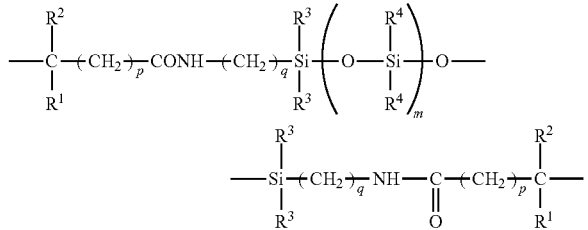

Formula (I)

wherein $R^1$s and $R^2$s are the same or different and each represents a hydrogen atom, an alkyl group having 1 to 6 carbon atoms or a nitrile group; $R^3$s are the same or different and each represents a hydrogen atom or an alkyl group having 1 to 6 carbon atoms; $R^4$s are the same or different and each represents a hydrogen atom, a halogen atom, a substituted or nonsubstituted alkyl group having 1 to 6 carbon atoms or a phenyl group having 6 to 12 carbon atoms; p and q are the same or different and each represents an integer of 0 to 6; and m represents an integer of 0 to 600, an acrylic block (a-2) containing an active energy ray-curable double bond group, and a fluoroalkyl group-containing acrylic block (a-3).

The above-described composition for hard coat preferably includes:

the active energy ray-curable silicone-acrylic copolymer (A) in an amount of 0.1 to 50% by weight;

the active energy ray-curable polyfunctional compound (B) in an amount of 50 to 99.8% by weight;. and the electrically conductive material (C) in an amount of 0.1 to 60% by weight, with the proviso that the percentages by weight of the components (A) to (C) are all based on the weights of the solid contents in the composition, and the total weight of the solid contents of individual components in the composition is defined as 100% by weight.

Preferably, the above-described composition for hard coat further includes a photopolymerization initiator (D).

The weight ratios of the individual blocks constituting the above-described active energy ray-curable silicone-acrylic copolymer (A) are preferably as follows:

the polysiloxane block (a-1): 0.1 to 40% by weight;

the acrylic block (a-2) containing the active energy ray-curable double bond group: 5 to 94.8% by weight; and the fluoroalkyl group-containing acrylic block (a-3): 4.9 to 49.9% by weight.

The above-described electrically conductive material (C) is preferably metal oxide fine particles containing at least one element selected from the group consisting of antimony, indium and tin.

The present invention also provides an article having a hard coat layer formed from the above-described composition for hard coat on a surface of the article.

The present invention further provides an article comprising a multi-layered object having a hard coat layer formed from the above-described composition for hard coat and a light transmitting layer.

The above-described light transmitting layer is preferably a layer obtained from an active energy ray-curable material including a urethane(meth)acrylate oligomer.

The above-described article is preferably an information recording medium.

The present invention further provides a method for producing an article, comprising a step of forming a hard coat layer wherein the above-described composition for hard coat is applied onto the light transmitting layer, and then the applied composition for hard coat is cured by irradiation of an active energy ray.

In the above-described method for producing the article, it is preferable to form the hard coat layer by applying the composition for hard coat under the condition that the light transmitting layer is still uncured or half cured.

The composition for hard coat of the present invention has an advantage that it is possible to provide a hard coat layer excellent in anti-staining property, scratch resistance, abrasion resistance and antistatic property without impairing the optical properties or the recording properties as required for articles such as information recording media. The hard coat layer provided by the composition for hard coat of the present invention further has an advantage of being excellent in the anti-staining durability that is a capability of maintaining the anti-staining property over a long term.

Additionally, the composition for hard coat of the present invention is active energy-ray curable and hence is excellent in the production efficiency and the production cost at the time of forming a hard coat layer. Thus, the present invention enables more inexpensive, simpler and easier provision of an article having a hard coat layer having anti-staining property, anti-staining durability, scratch resistance and abrasion resistance.

In particular, formation of the hard coat layer on the surface of the light transmitting layer in an information recording medium enables to conduct recording/reproduction on an information recording medium without impairing the optical properties and recording properties required for information recording media, and additionally enables to obtain an information recording medium excellent in anti-staining property, anti-staining durability, scratch resistance, abrasion resistance and antistatic property.

DETAILED DESCRIPTION OF THE INVENTION

Figure 1:
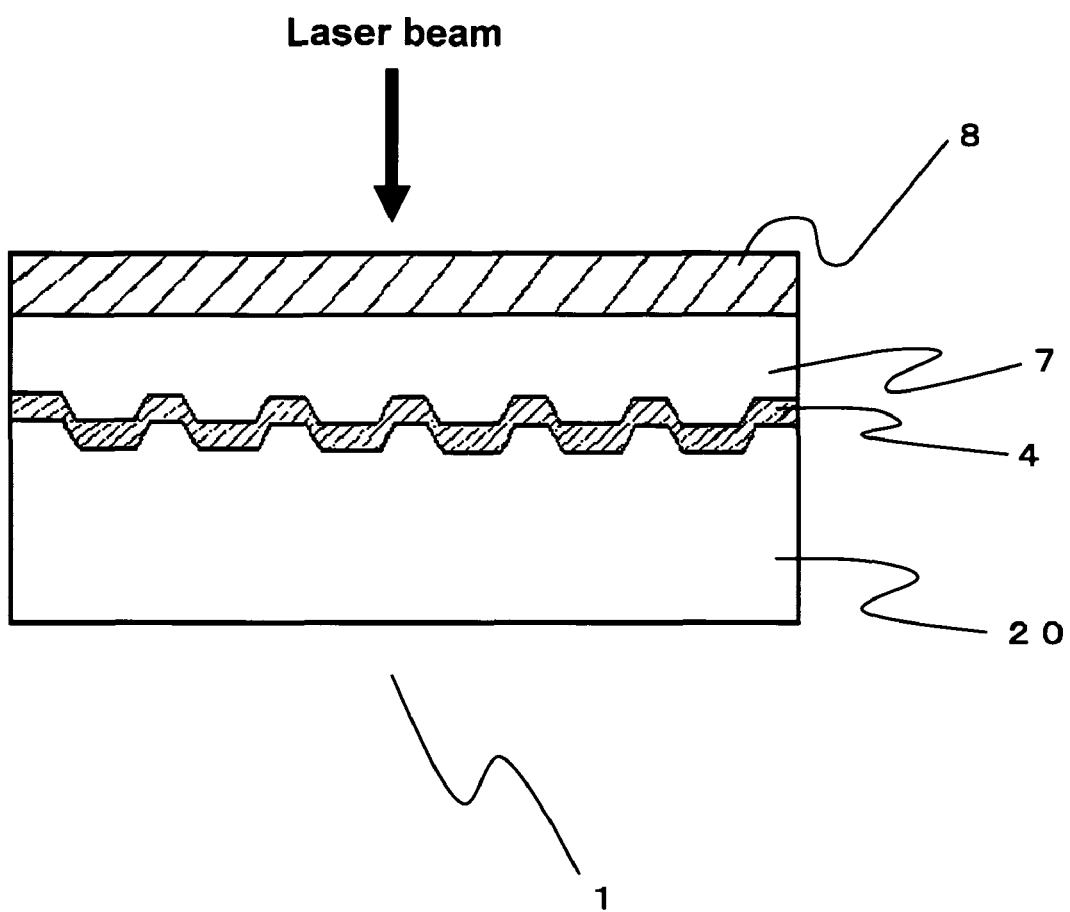
FIG. 1 is a schematic cross-sectional view illustrating an example of the layer structure of an information recording medium that is an example of an article of the present invention.

The composition for hard coat of the present invention comprises: an active energy ray-curable silicone-acrylic copolymer (A); an active energy ray-curable polyfunctional compound (B); and an electrically conductive material (C), and comprises optionally a photopolymerization initiator (D). Hereinafter, the individual components are described in detail.

Active Energy Ray-Curable Silicone-Acrylic Copolymer (A)

The active energy ray-curable silicone-acrylic copolymer (A) contains at least the following blocks:

a polysiloxane block (a-1), an acrylic block (a-2) containing an active energy ray-curable double bond group, and a fluoroalkyl group-containing acrylic block (a-3).

By forming the hard coat layer of the present invention with a composition for hard coat including the active energy ray-curable silicone-acrylic copolymer, a hard coat layer excellent in anti-staining property, anti-staining durability, scratch resistance, abrasion resistance, antistatic property and the like is obtained.

Polysiloxane Block (a-1)

Examples of the polysiloxane block (a-1) contained in the active energy ray-curable silicone-acrylic copolymer (A) in the present invention include the block represented by the following formula (I):

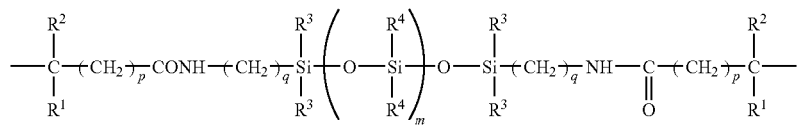

Formula (I)

In the above-presented formula (I), $R^1$s and $R^2$s are the same or different and each represents a hydrogen atom, an alkyl group having 1 to 6 carbon atoms or a nitrile group; $R^3$s are the same or different and each represents a hydrogen atom or an alkyl group having 1 to 6 carbon atoms; $R^4$s are the same or different and each represents a hydrogen atom, a halogen atom, a substituted or nonsubstituted alkyl group having 1 to 6 carbon atoms or a phenyl group having 6 to 12 carbon atoms; p and q are the same or different and each represents an integer of 0 to 6; and m represents an integer of 0 to 600.

More preferably, $R^1$s each represent a hydrogen atom or an alkyl group having 1 to 3 carbon atoms; $R^2$s each represent a nitrile group; $R^3$s are the same or different, and each represents a hydrogen atom or an alkyl group having 1 to 3 carbon atoms; $R^4$s are the same or different and each represents a hydrogen atom, a halogen atom, a substituted or nonsubstituted alkyl group having 1 to 3 carbon atoms or a phenyl group having 6 to 9 carbon atoms; p and q are the same or different and each represents an integer of 0 to 6; and m represents an integer of 30 to 200. Particularly preferably, $R^1$s, $R^3$s and $R^4$s each represent a methyl group.

The inclusion of the polysiloxane block (a-1) in the active energy ray-curable silicone-acrylic copolymer (A) included in the composition for hard coat enables to improve the water repellency of the obtained hard coat layer. And, this way enables to enhance the anti-staining property of the hard coat layer. Further, this copolymer has the polysiloxane structure as the skeleton thereof, thereby the water repellency of the hard coat layer can be maintained over a long term.

Acrylic Block (a-2) Containing Active Energy Ray-Curable Double Bond Group

The active energy ray-curable double bond group-containing acrylic block (a-2) contained in the active energy ray-curable silicone-acrylic block copolymer (A) in the present invention is prepared by the copolymerization of (meth) acrylic monomers having various substituents. And, the active energy ray-curable double bond group-containing acrylic block (a-2) in the present invention is characterized by having a pendant group having an active energy ray-curable double bond group.

Examples of the active energy ray-curable double bond group included in the active energy ray-curable double bond group-containing acrylic block (a-2) include an acrylic group and a methacrylic group. Examples of the pendant group contained in the active energy ray-curable double bond group-containing acrylic block (a-2) include the group represented by the following formula (II):

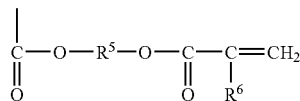

Formula (II)

In the above-presented formula (II), $R^5$ represents an optionally substituted straight chain or branched alkylene group having 1 to 10 carbon atoms, and $R^6$ represents a hydrogen atom or a methyl group. Examples of the substituent optionally contained in $R^5$ include a hydroxy group, an alkoxy group (for example, a methoxy group, an ethoxy group, an isopropoxy group and a butoxy group), a cyano group, a halogen atom (for example, Cl, Br, I and F), a carboxylic acid ester group, a sulfonic acid ester group, a nitro group and an amino group.

More preferably, $R^5$ represents an optionally substituted straight chain or branched alkylene group having 1 to 6 carbon atoms, and $R^6$ represents a methyl group. Examples of the substituent optionally contained in $R^5$ preferably include a hydroxy group.

By including the active energy ray-curable double bond group-containing acrylic block (a-2) in the active energy ray-curable silicone-acrylic copolymer included in the composition for hard coat, the copolymer comes to acquire the active energy ray curing characteristics. The presence of the active energy ray-curable double bond group contained in the acrylic block enables to provide a copolymer that imparts a satisfactory mechanical strength to the hard coat layer. In general, examples of the active energy ray-curable group include, in addition to the active energy ray-curable double bond group, epoxy groups. These active energy ray-curable epoxy groups are generally cationically polymerizable. When the active energy ray-curable silicone-acrylic copolymer including these epoxy groups is used, it is necessary to use a cationic polymerization initiator. However, the cationic polymerization initiator is unpreferable because the residual presence of the initiator in articles may adversely affect the environment. Additionally, the use of the active energy ray-curable silicone-acrylic copolymer including epoxy groups is unpreferable because such a copolymer requires a heat curing treatment to degrade the productivity.

Fluoroalkyl Group-Containing Acrylic Block (a-3)

The active energy ray-curable silicone-acrylic copolymer (A) in the present invention contains the fluoroalkyl group-containing acrylic block (a-3). Examples of the pendant group contained in the fluoroalkyl group-containing acrylic block (a-3) include the group represented by the following formula (III):

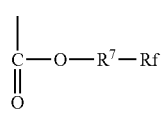

Formula (III)

In the above-presented formula (III), $R^7$ represents an alkylene group having 1 to 6 carbon atoms; and Rf represents a straight chain or branched fluoroalkyl group having 1 to 12 carbon atoms.

More preferably, $R^7$ represents an alkylene group having 1 to 3 carbon atoms, and Rf represents a straight chain fluoroalkyl group having 1 to 12 carbon atoms. Examples of the fluoroalkyl group include preferably $-(CF_2)_{2-6}H$ or $-C_nF_{2n+1}$ (n is an integer of 1 to 12), and more preferably include $-(CF_2)_n-CF_3$ (n is an integer of 1 to 7).

The inclusion of the fluoroalkyl group-containing acrylic block (a-3) in the active energy ray-curable silicone-acrylic copolymer (A) included in the composition for hard coat enables to improve the water repellency and the oil repellency of the obtained hard coat layer. And, this way enables to enhance the anti-staining property of the obtained hard coat layer. Further, the fluoroalkyl structure possessed by this copolymer as the skeleton thereof enables the water repellency and the oil repellency of the hard coat layer to be maintained over a long term. The use of such an active energy ray-curable silicone-acrylic copolymer (A) enables to form a hard coat layer having an excellent water repellency and an excellent oil repellency, without adding any so-called fluororesin or the like.

Other Acrylic Blocks (a-4)

The active energy ray-curable silicone-acrylic copolymer (A) in the present invention may further contain other acrylic blocks (a-4) other than (a-1) to (a-3). Examples of the pendant group contained in the other acrylic block (a-4) include an alicyclic hydrocarbon group. The inclusion of such other acrylic block (a-4) in the active energy ray-curable silicone-acrylic copolymer (A) included in the composition for hard coat enables to prepare the active energy ray-curable silicone-acrylic copolymer (A) capable of imparting to the hard coat layer a satisfactory adhesion to the substrate.

The weight ratios of the individual blocks, in the present invention, constituting the active energy ray-curable silicone-acrylic copolymer (A) are preferably as follows:

the polysiloxane block (a-1): 0.1 to 40% by weight and more preferably 10 to 40% by weight;

the active energy ray-curable double bond group-containing acrylic block (a-2): 5 to 94.8% by weight and more preferably 15 to 70% by weight; and the fluoroalkyl group-containing acrylic block (a-3): 4.9 to 49.9% by weight and more preferably 5 to 35% by weight. When the active energy ray-curable silicone-acrylic copolymer (A) further contains the other acrylic block (a-4), the weight ratio of the other acrylic block (a-4) is 0.1 to 5% by weight and more preferably 0.1 to 3% by weight, with the proviso that the total sum of the weight ratios of the blocks (a-1), (a-2), (a-3) and (a-4) is 100% by weight.

When the weight ratio of the polysiloxane block (a-1) is less than 0.1% by weight, the polymerization reaction for producing the active energy ray-curable silicone-acrylic copolymer becomes difficult, and when exceeds 40% by weight, the flexibility of the active energy ray-curable silicone-acrylic copolymer is increased, and the weight ratio of the active energy ray-curable double bond group-containing acrylic block is decreased and consequently the hard coat property is degraded, or the weight ratio of the fluoroalkyl group-containing acrylic block is decreased to cause a possibility that no sufficient oil repellency is maintained. When the weight ratio of the active energy ray-curable double bond group-containing acrylic block (a-2) is less than 5% by weight, the active energy ray curing characteristics is insufficient to cause a possibility that the hard coat property is degraded, and when exceeds 94.8% by weight, the weight ratio of the fluoroalkyl group-containing acrylic block is decreased to cause a possibility that no sufficient oil repellency is maintained. When the weight ratio of the fluoroalkyl group-containing acrylic block (a-3) is less than 4.9% by weight, there is caused a possibility that no sufficient oil repellency is maintained, and when exceeds 49.9% by weight, the flexibility of the active energy ray-curable silicone-acrylic copolymer is increased and the weight ratio of the active energy ray-curable double bond group-containing acrylic block is decreased to cause a possibility that the hard coat property is degraded.

Preparation of the Active Energy Ray-Curable Silicone-Acrylic Copolymer (A)

As an example of the preparation method of the active energy ray-curable silicone-acrylic copolymer (A), quoted is a method in which an azo group-containing polysiloxane compound, a fluoroalkyl group-containing unsaturated monomer, acrylic acid and/or methacrylic acid are copolymerized, and then an epoxy group-containing ethylenically unsaturated monomer is reacted. At the time of the copolymerization, other radical polymerizable monomers may also be used in combination. As another example of the preparation method of the active energy ray-curable silicone-acrylic copolymer (A), quoted is a method in which an azo group-containing polysiloxane compound, a fluoroalkyl group-containing unsaturated monomer and an epoxy group-containing ethylenically unsaturated monomer are copolymerized, and then acrylic acid and/or methacrylic acid is reacted. Also in this method, at the time of the copolymerization, other radical polymerizable monomers may be used in combination.

In these preparation methods, the monomer components other than the azo group-containing polysiloxane compound form the acrylic blocks in the active energy ray-curable silicone-acrylic copolymer (A), and the active energy ray-curable double bond group-containing acrylic block (a-2), the fluoroalkyl group-containing acrylic block (a-3), and where necessary, the other acrylic block (a-4) are formed. The use of the other radical polymerizable monomers enables to control the physical properties such as the adhesion of the hard coat layer obtained from the composition for hard coat.

Examples of the azo group-containing polysiloxane compound used for the preparation of the active energy ray-curable silicone-acrylic copolymer include the compound represented by the following formula (IV):

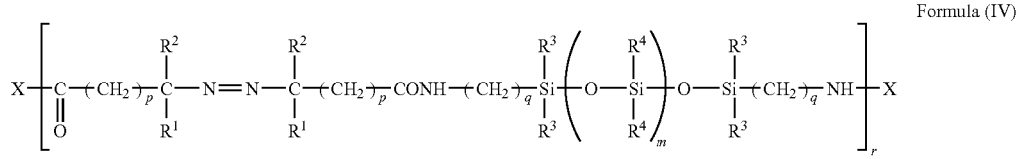

Formula (IV)

In the above-presented formula (IV), $R^1$ to $R^4$, m, p and q are defined in the same manner as described above, Xs are the same or different and each represents a halogen atom, and r is an integer of 1 to 20.

The azo group-containing polysiloxane compound has a characteristic that this compound is decomposed by heating or active energy ray irradiation to generate nitrogen and radical species. The radical species generated are easily polymerized with various vinyl monomers. Accordingly, by heating or active energy ray irradiation in the presence of the azo group-containing polysiloxane compound and various vinyl monomers, the azo group-containing polysiloxane compound functions as a polymerization initiator and at the same time supplies radical species having the polysiloxane block, and consequently, the copolymer including the polysiloxane block can be easily prepared.

The azo group-containing polysiloxane compound can be prepared by acid chloridizing, for example, a 2,2'-azobisnitrile derivative having a carboxyl group such as 4,4'-azobis (4-cyanovaleric acid) and the homolog thereof, and by reacting this acid chloridized derivative with a polysiloxane chain-containing compound such as a polydimethylsiloxane having amino groups or hydroxyl groups at the both terminals thereof. Such an azo group-containing polysiloxane compound is described in Japanese Patent Publication No. 2-33053 and Japanese Patent Laid-Open No. 7-18139, and the structure and the preparation method thereof are well known. The azo group-containing polysiloxane compound having a structure in which 4,4'-azobis(4-cyanovaleric acid) is bonded to the polydimethylsiloxane chain through an amide bond is commercially available from Wako Pure Chemical Industries, Ltd. under a trade name of VPS-series.

Examples of the epoxy group-containing ethylenically unsaturated monomer include glycidyl(meth)acrylate, β-methylglycidyl(meth)acrylate, 3,4-epoxycyclohexanyl(meth) acrylate and 4-hydroxybutyl acrylate glycidyl ether. For the purpose of preparing a coating composition exhibiting well-balanced curing characteristics and storage stability, it is preferable to use glycidyl(meth)acrylate.

Examples of the fluoroalkyl group-containing unsaturated monomer that can be used for introducing the fluoroalkyl group-containing acrylic block (a-3) include fluoroalkyl (meth)acrylates such as 2-(perfluorohexyl)ethyl (meth)acrylate, 3-perfluorohexyl-2-hydroxypropyl (meth)acrylate, 2-(perfluorooctyl)ethyl (meth)acrylate, 2-(perfluorodecyl) ethyl (meth)acrylate, 2-(perfluoro-3-methylbutyl)ethyl (meth)acrylate, 2,2,2-trifluoroethyl (meth)acrylate, 2,2,3,3-tetrafluoropropyl (meth)acrylate, 1H,1H,5H-octafluoropentyl (meth)acrylate, 2-(perfluorobutyl)ethyl (meth)acrylate and 2,2,3,3,3-pentafluoropropyl (meth)acrylate.

Examples of the other radical polymerizable monomer usable for the preparation of the active energy ray-curable silicone-acrylic copolymer include: styrene and substituted derivatives of styrene in which α-, o-, m-, p-positions are substituted with alkyl, alkoxy, halogen, haloalkyl, nitro, cyano, amide or ester; olefins such as butadiene, isoprene and neoprene; methacrylic or acrylic acid esters of methyl, ethyl, n-propyl, i-propyl, n-butyl, sec-butyl, tert-butyl, pentyl, neopentyl, isoamylhexyl, cyclohexyl, adamantyl, allyl, propargyl, phenyl, naphthyl, anthracenyl, anthraquinonyl, piperonyl, salicyl, cyclohexyl, benzyl, phenethyl, cresyl, triphenylmethyl, dicyclopentanyl and cumyl; and anthranyl amide, acrylonitrile, acrolein, methacrylonitrile, vinyl chloride, vinylidene chloride, vinyl fluoride, vinylidene fluoride, vinylpyridine and vinyl acetate. These compounds may be used each alone, or in combinations of two or more thereof.

Preferable examples of the other radical polymerizable monomer may include monomers having an alicyclic hydrocarbon group such as cyclohexyl (meth)acrylate. By using such a polymerizable monomer, the active energy ray-curable silicone-acrylic copolymer included in the composition for hard coat is made to incorporate therein the other acrylic block (a-4) having a pendant group having an alicyclic hydrocarbon group. Thus, it is possible to provide a copolymer capable of imparting to the hard coat layer a satisfactory adhesion to the substrate.

In the above-described one example of the preparation method, first the azo group-containing polysiloxane compound, acrylic acid and/or methacrylic acid, and the fluoroalkyl group-containing unsaturated monomer, and where necessary, the other radical polymerizable monomers are polymerized. Examples of the polymerization method of these compounds and monomers include bulk polymerization and solution polymerization. In these polymerizations, as described above, the azo group-containing polysiloxane compound functions as the polymerization initiator, and also serves as the source for supplying the radical species having the polysiloxane block. On the other hand, in polymerization, another polymerization initiator may also be used in combination. As the polymerization initiator usable in combination, there can be used compounds generally known as radical polymerization initiators, and examples of such compounds include: azo compounds such as 2,2'-azobisisobutyronitrile, 2,2'-azobis-(2,4-dimethylvaleronitrile), and 2,2'-azobis-(4-methoxy-2,4-dimethylvaleronitrile); organic peroxides such as benzoyl peroxide, lauroyl peroxide, t-butyl peroxypivalate, 1,1'-bis-(t-butyl peroxy)cyclohexane and t-butyl peroxy-2-ethylhexanoate; and hydrogen peroxide. When peroxide is used as the radical polymerization initiator, the peroxide may be used together with a reducing agent as a redox initiator.

The polymerization may be conducted, for example, by stirring for 3 to 48 hours at 60 to 150° C. In the solution polymerization method, the solvent used are not particularly limited; examples of such a solvent include: ethers such as tetrahydrofuran and dioxane; hydrocarbon solvents such as petroleum ether, n-hexane, cyclohexane, toluene and xylene; esters such as ethyl acetate and butyl acetate; alcohols such as methanol, ethanol, isopropanol and butanol; ketones such as acetone, methyl ethyl ketone, methyl isobutyl ketone and cyclohexanone; and acetonitirle, N,N-dimethyl formamide and dimethyl sulfoxide. The above-listed solvents can be used each alone or as mixtures of two or more thereof.

Successively, the obtained copolymer and the epoxy group-containing ethylenically unsaturated monomer are reacted with each other. In this reaction, the carboxylic acid contained in the acrylic block of the copolymer and the epoxy group contained in (meth) acrylic monomer react with each other, and thus the pendant group having an active energy ray-curable double bond group is introduced into the acrylic block, so as to allow the copolymer to have the active energy ray-curable double bond group-containing acrylic block (a-2). In this way, the active energy ray-curable silicone-acrylic copolymer (A) can be obtained. This reaction may be conducted, for example, by using a glass flask and stirring for 3 to 48 hours at 60 to 150° C.

The parts by weight of the individual components used in this preparation method are as follows: the azo group-containing polysiloxane compound: preferably 0.1 to 40 parts by weight and more preferably 10 to 40 parts by weight; acrylic acid and/or methacrylic acid: preferably 0.2 to 94.8 parts by weight and more preferably 15 to 70 parts by weight; the fluoroalkyl group-containing unsaturated monomer: preferably 4.9 to 49.9 parts by weight and more preferably 5 to 35 parts by weight; and the epoxy group-containing ethylenically unsaturated monomer: preferably 0.2 to 94.8 parts by weight and more preferably 5 to 70 parts by weight. Additionally, when the other radical polymerizable monomer is used, it is preferably used in 0.1 to 45.1 parts by weight and more preferably 0.1 to 35 parts by weight.

On the other hand, in the above-described another example of the preparation method, first the azo group-containing polysiloxane compound, the epoxy group-containing ethylenically unsaturated monomer and the fluoroalkyl group-containing unsaturated monomer, and where necessary, the other radical polymerizable monomers are polymerized. Successively, the obtained copolymer and acrylic acid and/or methacrylic acid are reacted with each other, and thus the epoxy group contained in the copolymer is reacted with the carboxyl groups contained in acrylic acid and/or methacrylic acid to yield the active energy ray-curable silicone-acrylic copolymer (A). In this method, the reaction methods such as the polymerization method are the same as described above.

The parts by weight of the individual components used in this preparation method are as follows: the azo group-containing polysiloxane compound: preferably 0.1 to 40 parts by weight and more preferably 10 to 40 parts by weight; the epoxy group-containing ethylenically unsaturated monomer: preferably 5 to 94.8 parts by weight and more preferably 15 to 70 parts by weight; the fluoroalkyl group-containing unsaturated monomer: preferably 4.9 to 49.9 parts by weight and more preferably 5 to 35 parts by weight; and acrylic acid and/or methacrylic acid: preferably 0.2 to 94.8 parts by weight and more preferably 5 to 70 parts by weight. Additionally, when the other radical polymerizable monomer is used, it is preferably used in 0.1 to 45.1 parts by weight and more preferably 0.1 to 35 parts by weight.

By applying these preparation methods, the active energy ray-curable silicone-acrylic copolymer (A) can be prepared in a preferable manner. The active energy ray-curable silicone-acrylic copolymer (A) is used in an amount of preferably about 0.1 to 50% by weight (solid content weight ratio) with respect to the weight of the solid content of the composition for hard coat and more preferably about 0.1 to 30% by weight. When the amount of the active energy ray-curable silicone-acrylic copolymer (A) is less than 0.1% by weight, there occurs a possibility that neither satisfactory water repellency nor satisfactory oil repellency is attained.

Active Energy Ray-Curable Polyfunctional Compound (B)

The composition for hard coat of the present invention includes the active energy ray-curable polyfunctional compound (B). The inclusion of the active energy ray-curable polyfunctional compound (B) improves the active energy ray curing characteristics of the composition for hard coat, and also enhances the mechanical strength of the obtained hard coat layer. The active energy ray-curable polyfunctional compound (B) has two or more active energy ray-curable groups in one molecule. As the active energy ray-curable polyfunctional compound (B), a compound having in one molecule two or more (meth)acryloyl groups can be used. As the active energy ray-curable polyfunctional compound (B), a compound having three or more (meth)acryloyl groups is preferable. The active energy ray-curable polyfunctional compound (B) may be either a monomer or an oligomer as long as the monomer or the oligomer is a compound having two or more (meth)acryloyl groups.

Examples of such a monomer include: alkylene glycol di(meth)acrylates such as ethylene glycol di(meth)acrylate and propylene glycol di(meth)acrylate; low-molecular-weight polyalkylene glycol di(meth)acrylates such as diethylene glycol di(meth)acrylate, tetraethylene glycol di(meth) acrylate, dipropylene glycol di(meth)acrylate and tripropylene glycol di(meth)acrylate, and the alkyleneoxide modified compounds thereof; polyol poly(meth)acrylates such as trimethylol propane tri(meth)acrylate, pentaerythritol di-, tri- or tetra(meth)acrylate, ditrimethylol propane tetra (meth)acrylate, dipentaerythritol penta- or hexa(meth)acrylate, and the alkyleneoxide modified compounds thereof; and isocyanuric acid alkylene oxide modified di- or tri(meth) acrylates.

Examples of the oligomer include oligomers of urethane (meth)acrylate, polyester (meth)acrylate, epoxy (meth)acrylate and polyether (meth)acrylate. Among these, urethane (meth)acrylate oligomer is preferably used.

Examples of the urethane (meth)acrylate oligomer include a reaction product obtained by further reacting a hydroxyl group-containing (meth)acrylate with a reaction product between polyol and an organic polyisocyanate. Here, examples of the polyol include: low-molecular-weight polyols such as ethylene glycol, propylene glycol, cyclohexane dimethanol and 3-methyl-1,5-pentanediol; polyether polyols such as polyethylene glycol and polypropylene glycol; and polyester polyols as the reaction products between the above-listed low-molecular-weight polyols and/or polyether polyols, and the acid components such as dibasic acids such as adipic acid, succinic acid, phthalic acid, hexahydrophthalic acid and terephthalic acid or the anhydrides thereof. Preferably used as the organic polyisocyanate are diisocyanates and polyfunctional isocyanates obtained by polymerizing these diisocyanates. Examples of the hydroxyl group-containing (meth)acrylate include 2-hydroxyethyl (meth)acrylate, 2-hydroxypropyl (meth)acrylate, pentaerythritol triacrylate and dipentaerythritol pentaacrylate; in particular, preferably used are polyfunctional acrylate compounds such as pentaerythritol triacrylate and dipentaerythritol pentaacrylate. The urethane (meth)acrylate oligomer usable as the active energy ray-curable polyfunctional compound (B) has a number average molecular weight of preferably 300 to 5,000, and more preferably 500 to 3,000. When the molecular weight is less than 300, the volatility is developed so as to be unfavorable for environmental health. When the molecular weight is larger than 5,000, there occurs a possibility that a high viscosity is attained to disturb the handling.

These active energy ray-curable polyfunctional compounds (B) may be used each alone or in combinations of two or more thereof.

As the active energy ray-curable polyfunctional compound (B), a monomer having three or more photopolymerizable groups in one molecule is preferably used. The use of such a monomer enables to enhance the mechanical strength of the obtained hard coat layer. Preferable examples of the active energy ray-curable polyfunctional compound (B) include pentaerythritol triacrylate, trimethylol propane EO-modified triacrylate, dipentaerythritol pentaacrylate and dipentaerythritol hexaacrylate.

The active energy ray-curable polyfunctional compound (B) is used in an amount of preferably about 50 to 99.8% by weight (solid content weight ratio) with respect to the weight of the solid content of the composition for hard coat and more preferably about 50 to 99.7% by weight. When the amount of the photopolymerizable polyfunctional compound (B) is less than 50% by weight, there occurs a possibility that the physical strengths such as the scratch resistance and abrasion resistance are poor.

Electrically Conductive Material (C)

The composition for hard coat of the present invention includes the electrically conductive material (C). The inclusion of the electrically conductive material (C) imparts conductivity to the hard coat layer formed with the composition for hard coat, and thereby enables to suppress the adsorption of dust or dirt to the hard coat layer due to the static electricity and the like. The electrically conductive material (C) may be any material as long as the material can impart electrical conductivity to the hard coat layer, and examples of such a material include metal oxides.

Examples of the electrically conductive material (C) include metal oxide fine particles including at least one element selected from the group consisting of antimony, indium and tin. Specific examples of such metal oxide fine particles include, but are not particularly limited to, the fine particles of antimony-doped tin oxide, tin-doped indium oxide, zinc antimonate, antimony pentaoxide, tin oxide and indium oxide. Among these metal oxide fine particles, the zin antimonate fine particles and the antimony pentaoxide fine particles can be particularly preferably used. These metal oxide fine particles may be used as an organosol which is a state of the metal oxide particles being dispersed in an organic solvent. Alternatively, the metal oxide fine particles can be used as dispersed, in a state of a powder, in the composition for hard coat.

When the electrically conductive material (C) is a metal oxide fine particle, the particle diameter of the metal oxide fine particle is preferably 18 nm or less in terms of the particle diameter determined on the basis of a BET method in which the particle diameter is calculated by a gas phase adsorption method in a state of particles. Alternatively, the particle diameter of the electrically conductive material (C) is preferably 100 nm or less in terms of the average particle diameter determined on the basis of a dynamic scattering method in which the particle diameter is measured in a state of a sol, namely, in a state of being dispersed in a solvent. By regulating the electrically conductive material (C) so as to fall within the above-described particle diameter ranges, the antistatic property can be imparted, without deteriorating the smoothness or the transparency of the obtained hard coat layer. The particle diameter lower limit of the electrically conductive material (C) is preferably 5 nm or more on the basis of any of a BET method and a dynamic scattering method.

Specific examples of the electrically conductive material (C) preferably used in the present invention may include: as antimony-doped tin oxide (ATO), FSS-10M and SNS-10M (both manufactured by Ishihara Sangyo Kaisha, Ltd.); as indium tin oxide (ITO), an ITO dispersion liquid (manufactured by C.I. Kasei Co., Ltd.); as zinc antimonate, Cernax CX-Z600M-3, CX-Z600M-3F, CX-Z210IP-F2 (all manufactured by Nissan Chemical Industries, Ltd.); and further, as antimony pentaoxide, ELCOM (manufactured by Catalysts & Chemicals Co., Ltd.). These materials can be easily available from the market.

The content of the electrically conductive material (C) in the total solid content of the composition for hard coat in the present invention is usually 0.1 to 60% by weight and preferably 2 to 55% by weight.

Photopolymerization Initiator (D)

The composition for hard coat of the present invention may optionally include the photopolymerization initiator (D). The presence of the photopolymerization initiator (D) enables to promote the polymerization at the time of light irradiation of the active energy ray-curable silicone-acrylic copolymer and the active energy ray-curable polyfunctional compound. Examples of the photopolymerization initiator (D) include alkyl phenone photopolymerization initiators, acyl phosphine oxide photopolymerization initiators, titanocene photopolymerization initiators and oxime ester photopolymerization initiators. Examples of the alkyl phenone photopolymerization initiator include:
2,2-dimethoxy-1,2-diphenylethan-1-one,
1-hydroxy-cyclohexyl-phenyl-ketone,
2-hydroxy-2-methyl-1-phenyl-propan-1-one,
1-[4-(2-hydroxyethoxy)-phenyl]-2-hydroxy-2-methyl-1-propan-1-one,
2-hydroxy-1-[4-[4-(2-hydroxy-2-methyl-propionyl)-benzyl]phenyl]-2-methyl-propan-1-one,
2-methyl-1-(4-methylthiophenyl)-2-morpholinopropan-1-one,
2-benzyl-2-dimethylamino-1-(4-morpholinophenyl)-butanone-1 and 2-(dimethylamino)-2-[(4-methylphenyl)methyl]-1-[4-(4-morpholinyl)phenyl]-1-butanone. Examples of the acyl phosphine oxide photopolymerization initiators include 2,4-6-trimethylbenzoyl-diphenyl-phosphine oxide and bis(2,4,6-trimethylbenzoyl)-phenylphosphine oxide. Examples of the titanocene photopolymerization initiator include bis(η5-2,4-cyclopentadien-1-yl)-bis(2,6-difluoro-3-(1H-pyrrol-1-yl)-phenyl)titanium. Examples of the oxime ester photopolymerization initiator include 1,2-octanedione 1-[4-(phenylthio)-2-(O-benzoyloxime)], ethanone 1-[9-ethyl-6-(2-methylbenzoyl)-9H-carbazol-3-yl]-1-(O-acetyl oxime), oxyphenyl acetic acid, 2-[2-oxo-2-phenylacetoxyethoxy]ethyl ester, and 2-[2-hydroxyethoxy]ethyl ester. These photopolymerization initiators may be used each alone or in combinations of two or more thereof.

Among the above-listed photopolymerization initiators (D), more preferably used are
2-hydroxy-2-methyl-1-phenyl-propan-1-one,
1-hydroxy-cyclohexyl-phenyl-ketone,
2-methyl-1-(4-methylthiophenyl)-2-morpholinopropan-1-one,
2-benzyl-2-dimethylamino-1-(4-morpholinophenyl)-butanone-1 and 2,2-dimethoxy-1,2-diphenylethan-1-one.

The photopolymerization initiator (D) is used in an amount of preferably about 0 to 20% by weight (solid content weight ratio) with respect to the weight of the solid content of the composition for hard coat. When the amount of the photopolymerization initiator (D) falls outside the above-described range, there occurs a possibility that the physical strength is degraded.

The composition for hard coat of the present invention more preferably includes the above-described individual components in the following amounts:
the active energy ray-curable silicone-acrylic copolymer (A): 0.1 to 50% by weight;
the active energy ray-curable polyfunctional compound (B): 50 to 99.8% by weight; and
the electrically conductive material (C): 0.1 to 60% by weight,
with the proviso that the percentages by weight of the above-described components are all based on the weights of the solid contents in the composition, and the total weight of the individual solid contents is defined as 100% by weight.

When the composition for hard coat of the present invention further includes the photopolymerization initiator (D), the above-described individual components are more preferably included in the following amounts:
the active energy ray-curable silicone-acrylic copolymer (A): 0.1 to 30% by weight;
the active energy ray-curable polyfunctional compound (B): 50 to 99.7% by weight;
the electrically conductive material (C): 0.1 to 60% by weight; and
the photopolymerization initiator (D): 0.1 to 20% by weight,
with the proviso that the percentages by weight of the above-described components are all based on the weights of the solid contents in the composition, and the total weight of the individual solid contents is defined as 100% by weight.

Other Components

The composition for hard coat of the present invention may also include additives where necessary. The inclusion of such additives enables to impart appropriate properties to an article provided with a hard coat layer. However, such additives are not necessarily needed. Examples of the usable additives include TEGO (trade mark) Rad series (manufactured by Tego Co., Ltd.), 2100, 2200N, 2250, 2500, 2600 and 2700 silicone additives.

When such additives are used, the amount thereof is preferably about 0.01 to 1% by weight with respect to the weight of the solid content of the composition for hard coat.

The composition for hard coat of the present invention may further include an organic solvent as a diluent where necessary. Specific examples of such an organic solvent include: aromatic solvents such as toluene and xylene; aliphatic solvents such as hexane, heptane, octane and mineral spirit; ketone solvents such as methyl ethyl ketone, acetone, methyl isobutyl ketone and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole and phenetole; ester solvents such as ethyl acetate, butyl acetate, isopropyl acetate and ethylene glycol diacetate; amide solvents such as dimethylformamide, diethylformamide, dimethyl sulfoxide and N-methylpyrrolidone; cellosolve solvents such as methyl cellosolve, ethyl cellosolve and butyl cellosolve; alcohol solvents such as methanol, ethanol and propanol; and halogenated solvents such as dichloromethane, dichloroethane and chloroform. These solvents may be used each alone or as mixtures thereof.

The composition for hard coat of the present invention may further include, where necessary, usually used additives such as a photopolymerization initiator aid, an organic filler, a polymerization inhibitor, an antioxidant, an ultraviolet absorber, a light stabilizer, an antifoamer, a leveling agent and a pigment.

Composition for Hard Coat

The composition for hard coat of the present invention includes at least the active energy ray-curable silicone-acrylic copolymer (A), the active energy ray-curable polyfunctional compound (B) and the electrically conductive material (C), and includes, where necessary, the photopolymerization initiator (D). Thus, the use of this composition for hard coat enables to form an article having a hard coat layer excellent in scratch resistance, abrasion resistance and antistatic property, and additionally excellent in anti-staining property and anti-staining durability even when the hard coat layer is a single layer.

The composition for hard coat of the present invention is active energy-ray curable. Therefore, the composition has an advantage of needing no heat polymerization at the time of forming the hard coat layer. For example, among various articles, some articles include low heat-resistant materials such as resin portions. The composition for hard coat of the present invention has an advantage of being capable of satisfactorily forming the hard coat layer even for the articles including such low heat-resistant materials.

In the preparation method of the composition for hard coat of the present invention, for example, the composition for hard coat of the present invention can be prepared by mixing the active energy ray-curable silicone-acrylic copolymer (A), the active energy ray-curable polyfunctional compound (B) and the electrically conductive material (C), and where necessary, the photopolymerization initiator (D), and further where necessary, additives, an organic solvent and the like.

Provision of the composition for hard coat of the present invention on the surface of the light transmitting layer of articles such as information recording media such as CD, DVD, BD and HD-DVD enables to form a hard coat layer on the surface of the light transmitting layer of the information recording media.

Examples of the method for providing the composition for hard coat on the light transmitting layer include coating methods such as a spin coating method, a dip coating method, a gravure coating method, a spray method, a roller method and a brush coating method. Among these coating methods, the spin coating method is preferable from the viewpoint of the easiness and the cost-efficiency of the production method. The hard coat layer is preferably formed so as for the thickness of the obtained hard coat layer to be 0.1 to 20 µm.

The composition for hard coat formed on the surface of the light transmitting layer of an information recording medium is successively cured by being exposed to the irradiation of the active energy ray, and thus the hard coat layer is formed. Examples of the active energy ray include ultraviolet ray, electron ray and visible light. When the light transmitting layer is formed by curing an active energy ray-curable resin, the hard coat layer can be formed by applying the composition for hard coat under the condition that the light transmitting layer is uncured or half cured and by simultaneously curing the composition for hard coat and the light transmitting layer. Such a formation method is preferable in the sense that the adhesion of the hard coat layer to the light transmitting layer is improved and the anti-crack property is also improved.

Information Recording Medium

The article of the present invention is characterized by having a hard coat layer obtained from the above-described composition for hard coat. Appropriate examples of such an article include an information recording medium. Hereinafter, the structure and the like of the information recording medium are described.

The information recording medium as an example of the article of the present invention comprises a supporting substrate, and at least a recording layer, a reflective layer and a light transmitting layer formed with a resin composition or the like on the supporting substrate. On at least one surface of a supporting substrate-side surface and a light transmitting layer-side surface of the information recording medium, a hard coat layer obtained from the above-described composition for hard coat is formed. In the information recording medium as an example of the article of the present invention, the hard coat layer is formed at least on a recording or reproduction laser beam incident-side surface, out of a light transmitting supporting substrate layer-side surface and a light transmitting layer-side surface, the light transmitting supporting substrate layer being as a supporting substrate and the light transmitting layer being as a protective layer. In other words, in the present invention, the composition for hard coat is applied onto and cured on a light transmitting layer as a supporting substrate or a protective layer, and thus the information recording medium comprising a multi-layered object including the light transmitting layer and the hard coat layer is produced.

Information recording media are generally classified into two types, namely, a type in which the recording or reproduction laser beam is incident on the light transmitting layer-side surface as the protective layer and a type in which the recording or reproduction laser beam is incident on the light transmitting supporting substrate layer side as the supporting substrate. First, description is made on the type in which the recording or reproduction laser beam is incident on the light transmitting layer-side surface as the protective layer.

Information Recording Medium in which the Recording or Reproduction Laser Beam is Incident on the Light Transmitting Layer-Side Surface, the Light Transmitting Layer Being the Protective Layer:

Such an information recording medium will be described referring to the Figures. FIG. 1 is a schematic cross-sectional view showing one example of the structure of an information recording medium. This information recording medium comprises a supporting substrate (20), a recording layer (4) that functions as an information recording layer on the supporting substrate (20), a light-transmitting layer (7) on the recording layer (4), and a hard coat layer (8) on the light-transmitting layer (7). The laser beam for recording or reproducing is incident through the hard coat layer (8) and the light-transmitting layer (7), and onto the recording layer (4). Therefore, the hard coat layer (8) is required to have light transmission properties.

An information recording medium as one example of the present invention can be applied to all different manner of recording layers. The information recording medium as one example of the article of the present invention can be applied, for example, to rewritable information recording media (phase-change type recording media) obtained from phase-change type recording materials, pit formation type read only information recording media, and rewritable information recording media obtained from magneto-optical recording materials. Normally, a dielectric layer or a reflective layer is provided on at least one side of the recording layer in order to protect the recording layer and provide an optical effect, but this layer has been omitted in FIG. 1.

Figure 2:
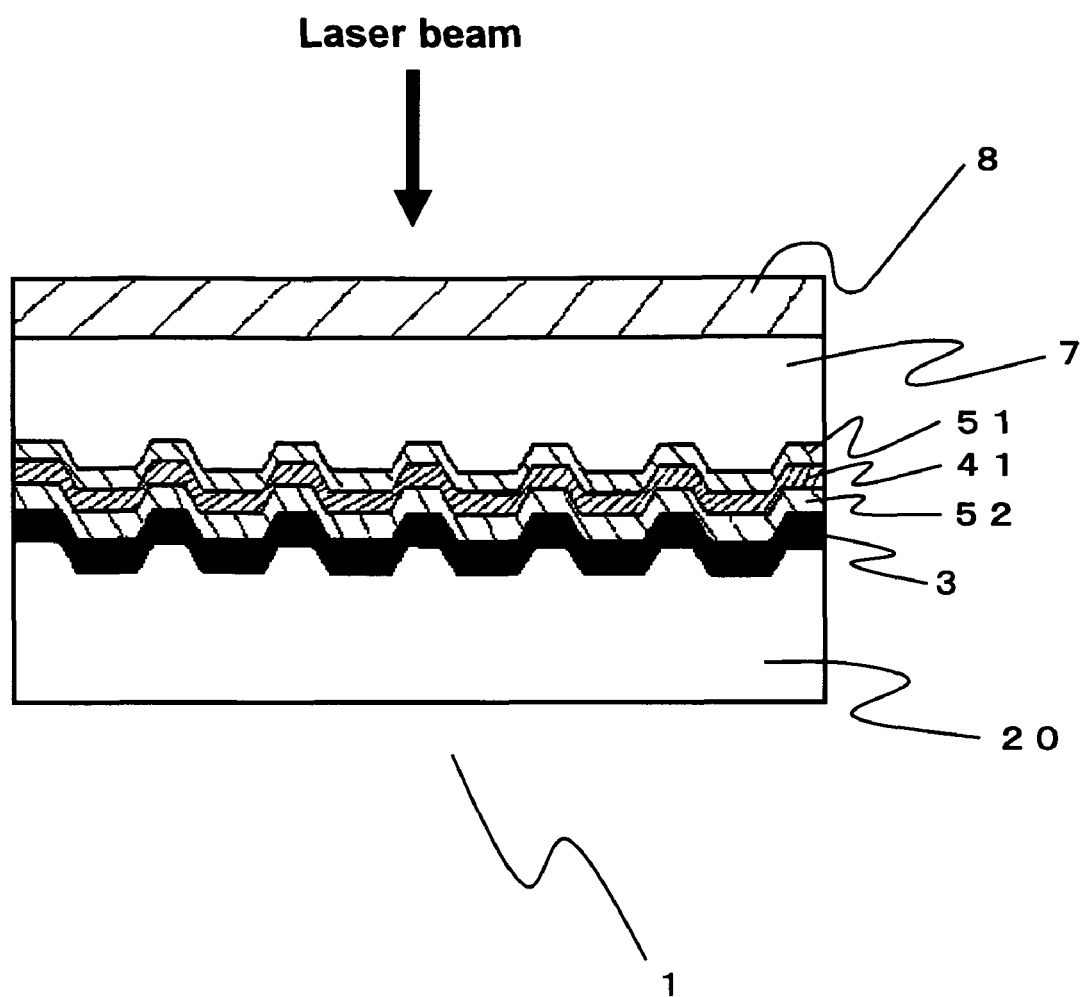
FIG. 2 is a schematic cross-sectional view illustrating an example of the layer structure of an information recording medium that is an example of the article of the present invention.

Next, a phase-change type recording medium will be described, exemplifying a BD-RE (Blu-ray Disc Rewritable). FIG. 2 is a schematic cross-sectional view showing one example of the layer structure of a BD-RE. In FIG. 2, a BD-RE has a supporting substrate (20) having information pits, pregrooves, and other fine scale concavities-convexities formed on one surface thereof. On this surface, the BD-RE has a reflective layer (3), a second dielectric layer (52), a phase-change recording material layer (41), and a first dielectric layer (51) formed in this order, and further a light transmitting layer (7) and a hard coat layer (8) on the first dielectric layer (51). The BD-RE is constituted in such a manner that a laser beam for recording or reproducing is incident through the hard coat layer (8) and the light transmitting layer (7). In this example, an information recording layer is formed of the reflective layer (3), the second dielectric layer (52), the phase-change recording material layer (41), and the first dielectric layer (51).

The supporting substrate (20) preferably has a thickness of 0.4 to 1.3 mm, and has information pits, pregrooves, and other fine scale concavities-convexities formed on the surface on which the recording layer (4) is formed.

As a supporting substrate (20), various plastic materials including polycarbonate resins, acrylic resins such as polymethyl methacrylate (PMMA), and polyolefine resins and the like may be used preferably. Such a supporting substrate (20) may be produced by injection molding. The supporting substrate (20) is not required to be optically transparent, because the BD-RE is constituted in such a manner that a laser light is incident through the light transmitting layer-side.

Optionally, the reflective layer (3) is deposited by a sputtering process on the supporting substrate (20). The reflective layer (3) may be formed using, as a main component, known inorganic materials as materials for reflective layers such as Au, Ag, Al, and alloys of these metals (for example, Al—Pd—Cu alloy). The reflective layer is preferably formed as a thin film with a thickness of 20 to 200 nm.

Subsequently, the second dielectric layer (52), the phase-change recording material layer (41), and the first dielectric layer (51) are deposited in this order by sputtering process on the reflective layer (3), or on the supporting substrate (20) in the case that no reflective layer is provided.

The phase-change recording material layer (41) has a property of changing reversibly by irradiation of laser light between the crystalline state and the amorphous state, and is formed of materials exhibiting different optical properties between the crystalline state and the amorphous state. Such materials is not particularly limited, however, examples of such material include Ge—Sb—Te, In—Sb—Te, Sn—Se—Te, Ge—Te—Sn, In—Se—Tl, In—Sb—Te, and Sb—Te—Ge—In. There is no limitation to the thickness of the phase-change recording material layer (41), which is for example in a range of about 3 to 50 nm.

The second dielectric layers (52) and the first dielectric layer (51) are formed on the top and under surfaces of the phase-change recording material layer (41), respectively, so as to sandwich the same. The second dielectric layers (52) and the first dielectric layer (51) have not only a function of protecting the phase-change recording material layer (41) mechanically and chemically but also a function as an interference layer for adjusting the optical properties. The second dielectric layers (52) and the first dielectric layer (51) may each consist of either a single layer or a plurality of layers.

Each of the second dielectric layers (52) and the first dielectric layer (51) is preferably formed of an oxide, a nitride, a sulfide, or a fluoride or a composite thereof, containing at least one metal selected from Si, Zn, Al, Ta, Ti, Co, Zr, Pb, Ag, Zn, Sn, Ca, Ce, V, Cu, Fe, and Mg.

There is no limitation to the thickness of the second dielectric layer (52). The thickness of the second dielectric layer (52) is preferably, for example, in a range of about 20 to 150 nm. There is no limitation to the thickness of the first dielectric layer (51). The thickness of the first dielectric layer (51) is preferably, for example, in a range of about 20 to 200 nm. Setting the thicknesses of the second dielectric layers (52) and the first dielectric layer (51) in these ranges makes it possible to adjust reflection.

The light transmitting layer (7) is formed on the above-described first dielectric layer (51). The light transmitting layer (7) is formed by using active energy ray-curable material, for example by means of a spin coating method, or by adhesion of light-transmitting sheet such as a polycarbonate sheet.

The active energy ray-curable material used for the light transmitting layer (7) should be optically transparent, exhibit low optical absorption or reflection in the laser wavelength range to be used, and have low birefringence, and is selected from ultraviolet ray-curable materials and electron ray-curable materials.

The active energy ray-curable material is preferably composed of an ultraviolet ray (electron ray)-curable compound or a composition for polymerizing thereof. Specific examples of the active energy ray-curable material may include the below-listed monomers, oligomer and polymers, containing in the molecules thereof or containing as introduced into the molecules thereof, groups capable of cross-linking or polymerizing under active energy ray irradiation: acrylic acid; methacrylic acid, (meth)acrylic acid ester compounds; acrylic specific monomers; (meth)acrylic double bond-containing monomers such as epoxy (meth)acrylate and urethane (meth)acrylate, and oligomers and polymers thereof; allyl double bond-containing monomers such as diallyl phthalate, and oligomers and polymers thereof; maleic acid derivatives; and the derivatives of these monomers, oligomers and polymers. These active energy ray-curable materials may be used each alone or in combinations of two or more thereof. It is preferable for the active energy ray-curable material to include the urethane (meth)acrylate oligomer, from the viewpoints of the control of the modulus of elasticity and the Tg of the coating film, and the stability with time of the coating film.

The light transmitting layer (7) can be formed, for example, by applying the active energy ray-curable material onto the first dielectric layer (51). In this case, it is preferable to apply the active energy ray-curable material by means of a spin coating method. Thus, the active energy ray-curable material is applied, thereafter cured by irradiation of active energy ray such as ultraviolet ray, and thus the light transmitting layer (7) is formed. The cure degree of the light transmitting layer (7) is preferably a half-cured state from the viewpoints of the adhesion to the hard coat layer (8) to be provided thereon and the anti-crack property. The thickness of the light transmitting layer (7) is preferably 30 to 150 µm and more preferably 50 to 120 µm.

As another example of the light transmitting layer (7) formation, the light transmitting layer can also be formed by using a light transmitting resin sheet. In this case, the active energy ray-curable material usable for forming the above-described light transmitting layer is applied onto the first dielectric layer (51) to form an uncured resin material layer. Successively, on the obtained uncured resin material layer, the light transmitting sheet as the light transmitting layer (7) is placed, thereafter the resin material layer is cured by irradiating active energy ray such as ultraviolet ray, and thus the light transmitting sheet is adhered to be the light transmitting layer (7). As the active energy ray-curable material used for forming the resin material layer, preferable is a material having a viscosity of 3 to 500 cp (25° C.). The formation of the resin material layer can be conducted by means of the spin coating method. The thickness of the resin material layer is, for example, recommended to be about 1 to 50 µm after curing.

As the light transmitting sheet, for example, a polycarbonate sheet having a thickness of 20 to 140 µm is used. More specifically, in the formation of the light transmitting layer (7), a polycarbonate sheet having a predetermined thickness is placed on the uncured resin material layer under a vacuum (0.1 atm or less), then the atmosphere is brought back to the air atmosphere, the resin material layer is cured by irradiating ultraviolet ray, and thus the light transmitting layer (7) can be formed.

On the obtained light transmitting layer (7), the hard coat layer (8) is formed by using the composition for hard coat. In the formation of the hard coat layer, the composition for hard coat is applied onto the light transmitting layer (7) to form the uncured hard coat layer, thereafter the uncured layer is cured by irradiating active energy ray such as ultraviolet ray, electron ray or visible light, and thus the hard coat layer (8) is formed.

The coating method of the composition for hard coat is not particularly limited, and various coating methods such as a spin coating method, a dip coating method and a gravure coating method can be used; however, preferable is the spin coating method that is easy and attains low cost. When a light transmitting sheet is used for formation of the light transmitting layer (7), the hard coat layer can also be formed by means of a method in which the hard coat layer (8) is beforehand formed on a continuous transmitting sheet web by a method such as a gravure coating method, then the light transmitting sheet web is blanked into the information recording medium shape, thereafter the thus obtained piece of the light transmitting sheet is placed on the uncured resin material layer, as described above, and then the curing is conducted.

When the composition for hard coat contains the non-reactive organic diluent, the composition for hard coat is applied to form an uncured hard coat layer, which is then dried by heating to remove the non-reactive organic solvent. Subsequently, the active energy rays may be irradiated to cure the uncured layer and to thereby form the hard coat layer (8). The heating/drying process is preferably carried out at a temperature of for example 40° C. or more and 100° C. or less, and over a time period of for example 30 seconds or more and 8 minutes or less, preferably 1 minute or more and 5 minutes or less, and more preferably 3 minutes or more and 5 minutes or less.

The active energy rays used for curing the composition for hard coat may be properly selected from ultraviolet ray, electron ray, visible light, and other proper active energy ray. Preferably, ultraviolet rays or electron rays are used. The thickness of the hard coat (8) after curing is preferably adjusted to about 0.5 to 5 µm.

In this manner, a phase-change type information recording medium such as that shown in FIG. 2 may be produced, which represents an example of an information recording medium in which the recording or reproduction laser beam is incident on the light transmitting layer-side surface.

Information Recording Medium in which the Recording or Reproduction Laser Beam is Incident on the Light Transmitting Supporting Substrate Layer-Side Surface, the Light Transmitting Supporting Substrate Layer being the Supporting Substrate:

Next, description is made on the information recording medium in which the supporting substrate-side surface acts as the surface upon which the recording/reproducing beam is incident.

Figure 3:
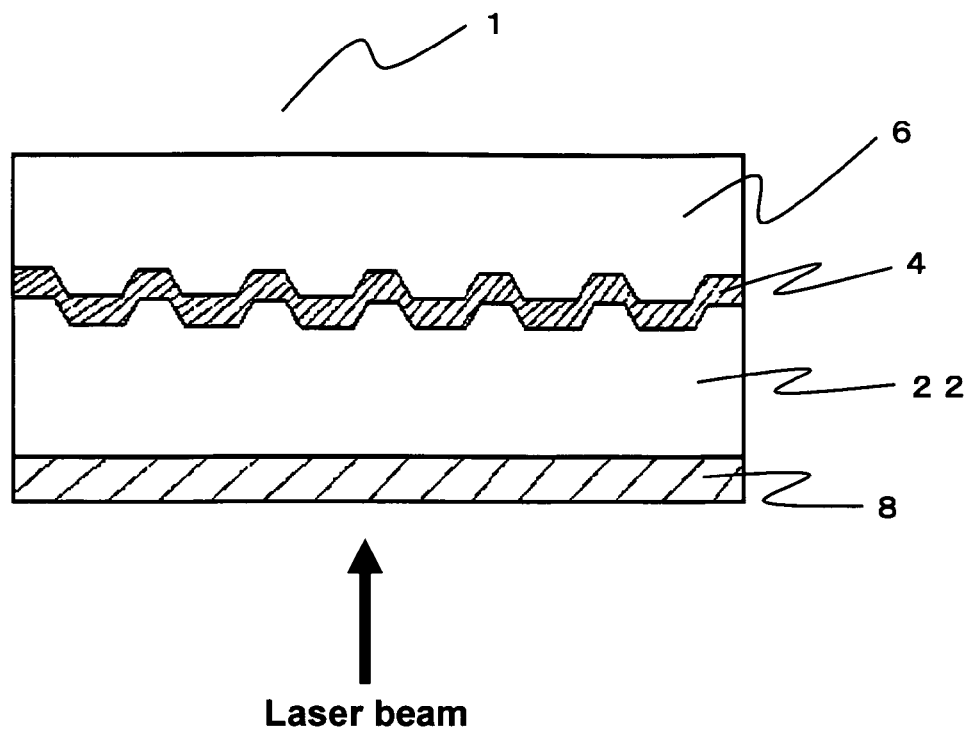
FIG. 3 is a schematic cross-sectional view illustrating another example of the layer structure of an information recording medium that is an example of the article of the present invention.

FIG. 3 is a schematic cross-sectional view illustrating another example of the structure of an information recording medium that is an example of the present invention. The information recording medium shown in FIG. 3 comprises a light transmitting supporting substrate layer (22), a recording layer (4) as an information recording layer on one surface of the light transmitting supporting substrate layer (22) which is a light transmitting layer, and a protective layer (6) on the recording layer (4), whereas a hard coat layer (8) is formed on the other surface of the light transmitting supporting substrate layer (22). The hard coat layer (8)-side surface acts as the surface upon which the recording/reproducing beam is incident, and the laser beam for recording or reproducing is incident through the hard coat layer (8) and a light transmitting supporting substrate layer (22), and onto the recording layer (4). Therefore, the hard coat layer (8) is required to have light transmission properties.

Figure 4:
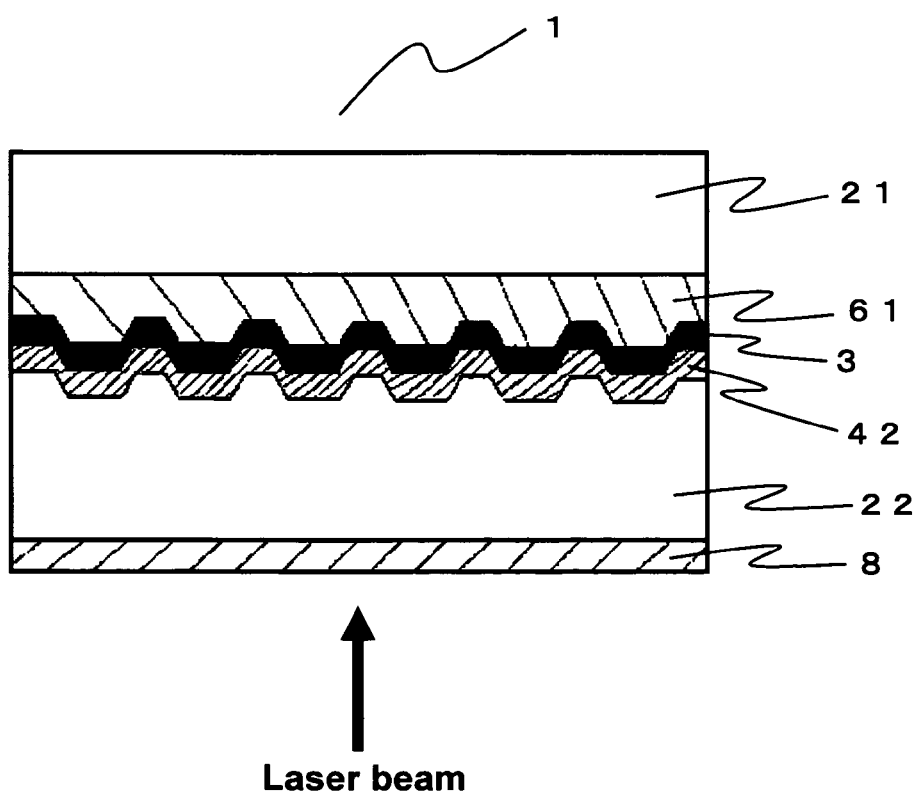
FIG. 4 is a schematic cross-sectional view illustrating another example of the layer structure of an information recording medium that is an example of the article of the present invention.

FIG. 4 is a schematic cross-sectional view illustrating the structure of an information recording medium (DVD-R) that is another example of the present invention. The information recording medium shown in FIG. 4 comprises a light transmitting supporting substrate layer (22), an organic dye layer (42) on one surface of the light transmitting supporting substrate layer (22), a reflective layer (3) on the organic dye layer (42), and a supporting layer (21) that is bonded to the reflective layer (3) via a protective and adhesive layer (61), whereas a hard coat layer (8) is formed on the other surface of the light transmitting supporting substrate layer (22). The hard coat layer (8)-side surface acts as the surface upon which the recording/reproducing beam is incident.

In addition to the write-once DVD-R disc shown in FIG. 4, a variety of other disc formats, including read-only DVD-ROM, and rewritable formats such as DVD-RAM and DVD- RW and the like can be commercially available. Read-only DVD formats include DVD-video and DVD-ROM, and with these types of information recording media, concavities-convexities known as pits, which are used to record the information signals, are formed in the surface of the light transmitting supporting substrate during production of the substrate, and a metal reflective layer such as Al, and then a protective layer, are formed sequentially on the supporting substrate surface. A supporting layer is then bonded to the protective layer via an adhesive layer, thus completing the information recording medium. In the case of rewritable DVD formats, the information recording layer can be formed in the same manner as for the phase-change type recording medium described above.

In the information recording media shown in FIG. 3 and FIG. 4 in which the recording or reproduction laser beam is incident on the supporting substrate-side surface, the substrate having light transmission properties is used for the light transmitting supporting substrate layer (22). The light transmitting supporting substrate layer (22) is formed, for example, by injection molding of a polycarbonate resin, with information formed in the surface of the resin as a series of prepits or pregrooves. However, materials other than a polycarbonate resin may also be used, and resins such as polyolefin resins can also be employed. The light transmitting supporting substrate layer (22) preferably has a thickness of 0.3 to 1.2 mm, and more preferably 0.4 to 0.8 mm.

The organic dye layer (42) is formed on one side of the obtained light transmitting supporting substrate layer (22). The organic dye layer (42) having an intended layer thickness can be formed as follows: the organic dye is dissolved in a solvent, and the dye solution obtained is applied on the one side by means of the spin coating method and dried. As the organic dye, various cyanine dyes, azo dyes, phthalocyanine dyes and the like can be used.

When the spin coating method is used for the formation of the organic dye layer (42), the organic dye is dissolved in a solvent and is used as an organic dye solution. The solvent is not particularly limited as long as the solvent can sufficiently dissolve the organic dye and does not adversely affect the supporting substrate. The concentration of the organic dye is preferably about 0.01 to 10% by weight.

The layer thickness of the organic dye layer (42) is appropriately selected according to the used dye. The layer thickness of the organic dye layer is preferably about 10 to 300 nm and particularly preferably about 60 to 250 nm.

On the obtained organic dye layer (42), the reflective layer (3) is provided by means of the sputtering method. As the material for the reflective layer, there is used a material which is sufficiently high in reflectance in the wave range of the reproduction light. As such a material, the elements such as Au, Ag and Al are used as the main components.

There are no particular restrictions on the thickness of the reflective layer, although values from about 10 to 300 nm are preferred, and values from about 80 to 200 nm are particularly desirable.

A supporting layer (21) is usually bonded to the reflective layer (3) via a protective and adhesive layer (61). This supporting layer (21) can use the same material as that used for the light transmitting supporting substrate layer (22) The layer thickness of the supporting layer (21) is preferably about 0.3 to 1.2 mm and more preferably about 0.4 to 0.8 mm.

There are no particular restrictions on the material used for the protective and adhesive layer (61), provided it is capable of bonding the supporting layer (21) and the light transmitting supporting substrate layer (22), and protecting the reflective layer from external forces, and conventional organic or inorganic materials can be used.

The hard coat layer (8) is formed by using the composition for hard coat on the other surface of the light transmitting supporting substrate layer (22). As described above, the light transmitting supporting substrate layer (22) corresponds to the light transmitting layer of the present invention.

The obtained information recording medium is the medium in which hard coat layer (8)-side acts as the surface upon which the recording/reproducing beam is incident. The recording/reproducing beam uses a laser beam with a wavelength of 650 or 660 nm, blue laser beam and the like.

In the manner described above, an information recording medium in which the supporting substrate-side surface acts as the surface upon which the recording/reproducing beam is incident may be produced.

EXAMPLES

The present invention is described more specifically with reference to following Examples, but is not limited to these Examples. In following Examples, "part(s)" and "percentage" are given in terms of weight unless otherwise indicated.

Production Example 1

Production of an Active Energy Ray-Curable Silicone-Acrylic Copolymer (1) Liquid A mixture was prepared by mixing 227 g (a quantity for the solid content weight ratio of the polysiloxane chain in the active energy ray-curable silicone-acrylic copolymer to be 25% by weight) of VPS-1001 (an azo group-containing polysiloxane compound, manufactured by Wako Pure Chemical Industries, Ltd., molecular weight of the polysiloxane chain: 10,000, solid content: 27%) with a monomer mixture (the content of a fluorine-containing unsaturated monomer in the active energy ray-curable silicone-acrylic copolymer: 30% by weight) composed of 74 g of acrylic ester 17FE (manufactured by Mitsubishi Rayon Co., Ltd.) and 37 g of acrylic acid. In a 1000 ml glass vessel equipped with stirring blades, a nitrogen introduction tube, a cooling tube and a dropping funnel, the obtained mixture was dropped at a constant rate, under nitrogen atmosphere, to 310 g of propylene glycol monomethyl ether acetate heated to 100° C. over a period of 3 hours, and thereafter, the resultant was allowed to react at 100° C. for 30 minutes.

Thereafter, to the obtained reaction liquid, 13 g of a liquid of propylene glycol monomethyl ether acetate containing 0.5 g of t-butylperoxy-2-ethylhexanoate was dropped at a constant rate over a period of 30 minutes, and the obtained reaction liquid was further allowed to react at 100° C. for 1.5 hours.

To this reaction liquid, under air bubbling, a mixture composed of 74 g of glycidyl methacrylate and 98 g of propylene glycol monomethyl ether acetate was dropped over a period of 1 hour, and then the obtained reaction liquid was further allowed to react over a period of 8 hours to yield the active energy ray-curable silicone-acrylic copolymer (1).

Production Example 2

Production of an Active Energy Ray-Curable Silicone-Acrylic Block Copolymer (2) Liquid A mixture was prepared by mixing 227 g (a quantity for the solid content weight ratio of the polysiloxane chain in the active energy ray-curable silicone-acrylic copolymer to be 25% by weight) of VPS-1001 (an azo group-containing polysiloxane compound, manufactured by Wako Pure Chemical Industries, Ltd., molecular weight of the polysiloxane chain: 10,000, solid content: 27%) with a monomer mixture (the content of a fluorine-containing unsaturated monomer in the active energy ray-curable silicone-acrylic copolymer: 30% by weight) composed of 74 g of acrylic ester 17FE (manufactured by Mitsubishi Rayon Co., Ltd.), 74 g of cyclohexyl methacrylate and 15 g of acrylic acid. In a 1000 ml glass vessel equipped with stirring blades, a nitrogen introduction tube, a cooling tube and a dropping funnel, the obtained mixture was dropped at a constant rate, under nitrogen atmosphere, to 310 g of propylene glycol monomethyl ether acetate heated to 100° C. over a period of 3 hours, and thereafter, the resultant was allowed to react at 100° C. for 30 minutes.

Thereafter, to the obtained reaction liquid, 13 g of a liquid of propylene glycol monomethyl ether acetate containing 0.5 g of t-butylperoxy-2-ethylhexanoate was dropped at a constant rate over a period of 30 minutes, and the obtained reaction liquid was further allowed to react at 100° C. for 1.5 hours.

To this reaction liquid, under air bubbling, a mixture composed of 22 g of glycidyl methacrylate and 98 g of propylene glycol monomethyl ether acetate was dropped over a period of 1 hour, and then the obtained reaction liquid was further allowed to react over a period of 8 hours to yield the active energy ray-curable silicone-acrylic copolymer (2).

Example 1

Preparation of a Composition for Hard Coat, and Production of an Information Recording Medium The active energy ray-curable silicone-acrylic copolymer (1) obtained in above-described Production Example 1 was used, and according to the composition shown in Table 2, the individual ingredients were mixed together to prepare a composition for hard coat.

An information recording medium having a layer structure shown in FIG. 2 was produced in the following manner. Using a disc shaped supporting substrate (20) (formed from polycarbonate, diameter 120 mm, thickness 1.1 mm) in which information recording grooves had been formed, sputtering was used to form a reflective layer (3) of thickness 100 nm comprising $Al_{98}Pd_1Cu_1$ (atomic ratio) on the groove-side surface of the substrate. The depth of the grooves, which is represented by light-path length at a wavelength $\lambda$=405 nm, was set into $\lambda/6$. The recording track pitch in the groove-recording scheme was set into 0.32 µm.

Subsequently, sputtering with an $Al_2O_3$ target was used to form a second dielectric layer (52) of thickness 20 nm on the surface of the reflective layer (3). Sputtering using an alloy target comprising a phase-changing material was then used to form a recording layer (4) of thickness 12 nm on the surface of the second dielectric layer (52). The composition (atomic ratio) of the recording layer (4) was $Sb_{74}Te_{18}(Ge_7In_1)$ Sputtering with a ZnS (80 mol %) —$SiO_2$ (20 mol %) target was then used to form a first dielectric layer (51) of thickness 130 nm on the surface of the recording layer (4).

Subsequently, a radical polymerizable, ultraviolet ray-curable material with the composition shown in Table 1 was applied onto the surface of the first dielectric layer (51) by spin coating, and was then irradiated with a weak ultraviolet ray of 20 mJ/cm² in integrated light quantity to form a 98 µm thick half-cured light transmitting layer (7).

TABLE 1

| Light transmitting layer: Composition of ultraviolet ray-curable material | |
|---|---|
| Urethane acrylate oligomer (a compound obtained by acrylating the both terminals of polycarbonate diol (molecular weight: 1000, trade name: Nipporan 981, manufactured by Nippon Polyurethane Industry Co., Ltd.) with hydrogenated MDI and 2-hydroxyethyl acrylate) | 75 parts by weight |
| Tetrahydrofurfuryl acrylate | 25 parts by weight |
| Photopolymerization initiator (1-hydroxycyclohexyl phenyl ketone) | 3 parts by weight |

Next, on the obtained half-cured light transmitting layer (7), a composition for hard coat prepared according to the composition for Example 1 shown in Table 2 was applied by spin coating to form a coating film. The obtained coating film was dried in a hot air dryer set at 80° C. for 180 seconds, and thereafter irradiated under nitrogen gas flow with electron beam to be cured to form a hard coat layer (8). The irradiation of electron beam was conducted with an electron ray irradiation apparatus Min-EB (manufactured by Ushio Inc.) under the conditions that the electron ray acceleration voltage was 50 kV and the irradiation dose was 100 kGy. The oxygen concentration in the irradiation atmosphere was 80 ppm. The thickness of the hard coat layer (8) after curing was 3 µm. Thereafter, the light transmitting layer was completely cured by irradiating ultraviolet ray with an integrated light quantity of 3 J/cm².

Example 2

Preparation of a Composition for Hard Coat, and Production of an Information Recording Medium The active energy ray-curable silicone-acrylic copolymer (1) obtained in above-described Production Example 1 was used, and according to the composition of Example 2 shown in Table 2, the individual ingredients were mixed together to prepare a composition for hard coat.

The obtained composition for hard coat was applied and dried in the same manner as in Example 1, and then an information recording medium was produced in the same manner as in Example 1 except that the hard coat layer (8) and the light transmitting layer were simultaneously cured by ultraviolet ray irradiation with an integrated light quantity of 3 J/cm² without applying electron beam irradiation for curing.

Example 3

Preparation of a Composition for Hard Coat, and Production of an Information Recording Medium The active energy ray-curable silicone-acrylic copolymer (2) obtained in above-described Production Example 2 was used, and according to the composition of Example 3 shown in Table 2, the individual ingredients were mixed together to prepare a composition for hard coat.

An information recording medium was produced in the same manner as in Example 1 except that the composition for hard coat obtained above was used.

Example 4

Preparation of a Composition for Hard Coat and Production of an Information Recording Medium The active energy ray-curable silicone-acrylic copolymer (2) obtained in above-described Production Example 2 was used, and according to the composition of Example 4 shown in Table 2, the individual ingredients were mixed together to prepare a composition for hard coat.

The obtained composition for hard coat was directly applied by spin coating to a polycarbonate layer that was a light transmitting supporting substrate layer (22) on the recording/reproduction beam incident-side of a DVD-R disc to form a coating film. The obtained coating film was dried in a hot air dryer set at 80° C. for 180 seconds, and thereafter irradiated with ultraviolet ray at an integrated light quantity of 1 J/cm² to be cured to form a hard coat layer (8), and thus an information recording medium was obtained.

Comparative Examples 1 to 3

According to the compositions of Comparative Examples 1 to 3 shown in Table 3, individual ingredients were mixed together to prepare compositions for hard coat. The obtained compositions for hard coat were used to produce information recording media in the same manner as in Example 2.

The information recording media obtained in Examples and Comparative Examples were used to conduct evaluations as follows.

Evaluation of Appearance

The surface of each of the hard coat layers of the information recording media obtained in Examples and Comparative Examples was visually observed for evaluation. The evaluation results obtained are shown in Tables 2 and 3.

Abrasion Resistance Test

The hard coat layers were produced respectively in the same manner as in Examples 1 to 5 and Comparative Examples 1 to 3 except that no information recording layer is formed. The surface of each of the hard coat layers was subjected to 500-times abrasion operations by applying a load of 500 g with a taper abrasion tester in accordance with JIS K7204:1999. An CS-10F Type IV truck wheel was used. The haze value of the surface of the hard coat layer after 500-times abrasion operations was measured with a haze meter (manufactured by Suga Test Instruments Co., Ltd.), and the difference between the haze value after the abrasion operations and the haze value before the abrasion operation was obtained as ΔHaze. The obtained results are shown in Tables 2 and 3.

Electric Signal Properties

The tracking error signal voltage generated on the basis of the reflected light from an information recording medium received with an optical pickup was compared with a beforehand set reference value to measure the variation values of the tracking error signal voltage, and the variability of these values was obtained as the variation value. The obtained results are shown in Tables 2 and 3. A case with the variation value of 35% or more was evaluated as "not good" and a case with the variation value of less than 35% was evaluated as "good". The obtained results are shown in Tables 2 and 3.

Half-Life

A half-life was measured in accordance with JIS L1094. In a test room set at a temperature of 25° C. and a relative humidity of 10%, specimens were cut out from each of the information recording media obtained in Examples and Comparative Examples to have a dimension of 35×35 mm respectively. Each of the specimens was set on a measurement apparatus, and the measurement was conducted according to the method described in JIS L1094 except that the measurement time was set at up to 180 minutes. The measurement result was given in terms of the time (half-life) in which the electrification voltage of the specimen was reduced by half. The shorter is this time, the more excellent is the antistatic property. In the information recording media in the present invention, having a this-type half-life of 60 minutes or less can be evaluated as free from troubles in practice.

Evaluation of Anti-Staining Property

A static contact angle was measured with a contact angle meter, Face Contact-Anglemeter manufactured by Kyowa Interface Science Co., Ltd. As measurement liquids, pure water and n-octane were used. The measurement environment was such that the temperature was 20° C. and the relative humidity was 60%. First, in the information recording media, the contact angles before rubbing, which is described later, were measured.

Evaluation of Anti-Staining Durability

Subsequently, the contact angles after rubbing with ethanol were measured. Bencot (manufactured by Asahi Kasei Fibers Corp.) was impregnated with ethanol, and then was pressed against the surface of the hard coat of each of the test samples with a load of 1 kg/cm², and reciprocated 100 times, and the contact angle was measured under the same conditions as described above. The measurement of the contact angles after the rubbing enables to evaluate the anti-staining durability; the smaller is the change of the contact angle between before and after the rubbing, the higher is the anti-staining durability. The obtained results are shown in Tables 2 and 3.

TABLE 2

| | | | Example 1 | Example 2 | Example 3 | Example 4 |
|---|---|---|---|---|---|---|
| Composition for hard coat | Active energy ray-curable silicone-acrylic copolymer (A) | (1) | 10 | 10 | — | — |
| | | (2) | — | — | 10 | 10 |
| | Active energy ray-curable polyfunctional compound (B)*¹ | | 60 | 60 | 60 | 60 |
| | Electrically conductive material (C)*² | | 30 | 30 | 30 | 30 |
| | Photopolymerization initiator (D)*³ | | — | 8 | — | 8 |
| | Propylene glycol monomethyl ether*⁴ | | 225 | 225 | 225 | 225 |
| | Fluorinated additive*⁵ | | — | — | — | — |
| | Photo-reactive silicone additive*⁶ | | — | — | — | — |
| Curing method of composition for hard coat | | | EB | UV | EB | UV |
| Degree of cure of light transmitting layer at the time of applying composition for hard coat | | | half-cured | half-cured | half-cured | * |
| Appearance | | | good | good | good | good |
| Abrasion resistance test; ΔHaze | | | 11 | 11 | 13 | 12 |
| Electric signal properties | | | good | good | good | good |
| Half-life (min.) | | | 25 | 25 | 20 | 20 |
| Anti-staining property, and Anti-staining durability | Contact angle with pure water (deg) | before rubbing | 106 | 105 | 107 | 104 |
| | | after rubbing | 105 | 102 | 105 | 102 |

TABLE 2-continued

|  |  |  | Example 1 | Example 2 | Example 3 | Example 4 |
|---|---|---|---|---|---|---|
|  | Contact angle with n-octane (deg) | before rubbing after rubbing | 48 47 | 46 42 | 43 41 | 43 39 |

*In Example 4, a polycarbonate layer was used as the light transmitting layer, and the composition for hard coat was directly applied to this polycarbonate layer.

TABLE 3

|  |  |  |  | Comparative example 1 | Comparative example 2 | Comparative example 3 |
|---|---|---|---|---|---|---|
| Composition for hard coat | Active energy ray-curable silicone-acrylic copolymer (A) | | (1) (2) | — — | — — | 10 — |
|  | Active energy ray-curable polyfunctional compound (B)*1 | | | 70 | 70 | 90 |
|  | Electrically conductive material (C)*2 | | | 30 | 30 | — |
|  | Photopolymerization initiator (D)*3 | | | 8 | 8 | 8 |
|  | Propylene glycol monomethyl ether*4 | | | 225 | 225 | 225 |
|  | Fluorinated additive*5 | | | 3 | — | — |
|  | Photo-reactive silicone additive*6 | | | — | 3 | — |
| Curing method of composition for hard coat | | | | UV | UV | UV |
| Degree of cure of light transmitting layer at the time of applying composition for hard coat | | | | half-cured | half-cured | half-cured |
| Appearance | | | | clouded | clouded | good |
| Abrasion resistance test; ΔHaze | | | | 18 | 20 | 27 |
| Electric signal properties | | | | not good | not good | good |
| Half-life (min.) | | | | 20 | 15 | >180 |
| Anti-staining property, and Anti-staining durability | Contact angle with pure water (deg) | before rubbing after rubbing | | 105 93 | 100 90 | 104 102 |
|  | Contact angle with n-octane (deg) | before rubbing after rubbing | | 55 40 | less than 5 less than 5 | 47 41 |

In the tables 2 and 3:
*1Dipentaerythritol hexaacrylate
*2Cernax CX-Z210IP-F2, manufactured by Nissan Chemical Industries, Ltd.
*3Irgacure 184, 1-hydroxy-cyclohexyl-phenyl-ketone
*4Solvent
*5Megafac F-484, manufactured by Dainippon Ink Chemical Industries, Co. Ltd.
*6BYK-3500, manufactured by BYK Chemie Japan Co., Ltd.

As can be seen from the results shown in Table 2, each of the hard coat layers of the present invention is such that: the abrasion resistance is satisfactory; the water contact angle is high both before and after the rubbing, and the water repellency and the water repellency durability are excellent; further, a high n-octane contact angle is attained although no additives such as a silicone additive and a fluorinated additive are added, and the n-octane contact angle is high both before and after the rubbing; the oil repellency and the oil repellency durability are excellent; and the short half-life indicates an excellent antistatic property.

On the other hand, in Comparative Examples 1 and 2 in which no active energy ray-curable silicone-acrylic copolymer was used, but a commercially available fluorinated compound or an active energy ray-curable silicone additive was added, the abrasion resistance was poor. In these Comparative Examples, although the water contact angle was high, Comparative Example 1 was poor in anti-staining durability and Comparative Example 2 was low in n-octane contact angle. Further, in these Comparative Examples, the surface was clouded and the electric properties of the information recording medium were impaired. In Comparative Example 3 in which active energy ray-curable silicone-acrylic copolymer was included but no electrically conductive material was included, although the surface was not found to be clouded, the electric properties and the anti-staining property of the information recording medium were satisfactory, it was verified that the half-life was long and accordingly poor in the antistatic property.

An article that has a hard coat layer obtained from the composition for hard coat of the present invention has a single-layered hard coat layer, and hence is provided with anti-staining property, scratch resistance, abrasion resistance and antistatic property, without deteriorating the optical properties and recording properties as required for information recording media and various display elements, further is excellent in the anti-staining durability enabling a long-term maintenance of the anti-staining property. Further, the hard coat layer in the article of the present invention is active energy ray-curable, and hence there can be provided inexpensively and easily an article that has a hard coat excellent in production efficiency and production cost, and having anti-staining property, anti-staining durability, scratch resistance, abrasion resistance and antistatic property. In particular, when a hard coat layer is formed on the surface of the light transmitting layer of an information recording medium, the recording/reproduction on the information recording medium can be conducted without deteriorating the optical properties and recording properties required for information recording media, and additionally there can be obtained an information recording medium excellent in scratch resistance, abrasion resistance, antistatic property, anti-staining property and anti-staining durability.

What is claimed is:

1. A composition for hard coat comprising:
0.1 to 50% by weight of an active energy ray-curable silicone-acrylic copolymer (A);
50 to 99.8% by weight of an active energy ray-curable polyfunctional compound (B); and
0.1 to 60% by weight of an electrically conductive material (C),
wherein the active energy ray-curable silicone-acrylic copolymer (A) contains:
a polysiloxane block (a-1) represented by the following formula (I):

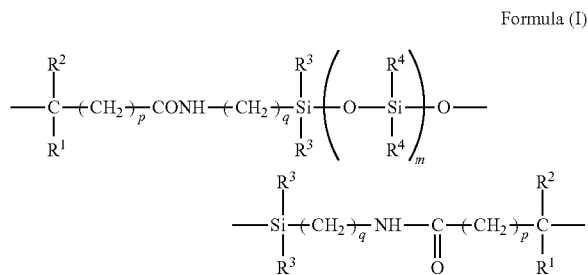

Formula (I)

wherein $R^1$s and $R^2$s are the same or different and each represents a hydrogen atom, an alkyl group having 1 to 6 carbon atoms or a nitrile group; $R^3$s are the same or different and each represents a hydrogen atom or an alkyl group having 1 to 6 carbon atoms; $R^4$s are the same or different and each represents a hydrogen atom, a halogen atom, a substituted or nonsubstituted alkyl group having 1 to 6 carbon atoms or a phenyl group having 6 to 12 carbon atoms; p and q are the same or different and each represents an integer of 0 to 6; and m represents an integer of 0 to 600,
an acrylic block (a-2) containing an active energy ray-curable double bond group, and
a fluoroalkyl group-containing acrylic block (a-3), and
wherein the percentages by weight of the components (A) to (C) are all based on the weight of solid content in the composition, and the total weight of solid contents of the individual components is defined as 100% by weight.

2. The composition for hard coat according to claim 1, further comprising: a photopolymerization initiator (D).

3. The composition for hard coat according to claim 1, wherein the active energy ray-curable silicone-acrylic copolymer (A) is composed of:
0.1 to 40% by weight of the polysiloxane block (a-1);
5 to 94.8% by weight of the acrylic block (a-2) containing active energy ray-curable double bond group; and
4.9 to 49.9% by weight of the fluoroalkyl group-containing acrylic block (a-3).

4. The composition for hard coat according to claim 1, wherein the electrically conductive material (C) is metal oxide fine particles containing at least one element selected from the group consisting of antimony, indium and tin.

* * * * *